May 18, 1937.  J. STEIN ET AL  2,080,676
MOUTHPIECE
Filed March 19, 1936
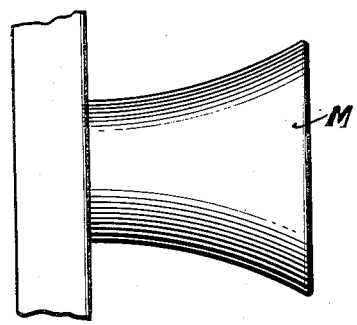
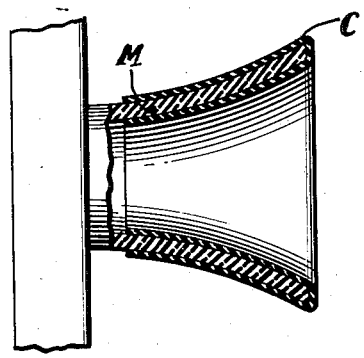
Jacob Stein
Ephraim Freedman
INVENTORS
BY Mock & Blum
ATTORNEYS Patented May 18, 1937

2,080,676

UNITED STATES PATENT OFFICE 2,080,676

MOUTHPIECE

Jacob Stein, New York, and Ephraim Freedman, Brooklyn, N. Y.

Application March 19, 1936, Serial No. 69,609

6 Claims. (Cl. 179—185)

Our invention relates to a new and improved mouthpiece for telephones or the like.

One of the objects of our invention is to provide a new and improved telephone mouthpiece or cover therefor which shall be made of rubber which has sanitary properties.

Another object of our invention is to provide a telephone mouthpiece, or a mouthpiece for apparatus which is similar to a telephone, which will have the necessary strength and rigidity and which will have strong antiseptic properties.

Other objects of our invention will be set forth in the following description and drawing, which illustrate preferred embodiments thereof, it being understood that the above statements of the objects of our invention are intended generally to explain the same without limiting it in any manner.

Fig. 1 is an elevation showing a conventional mouthpiece.

Fig. 2 is a sectional view showing a mouthpiece having an antiseptic rubber cover.

The mouthpiece M may be made according to the invention later stated herein. If desired said mouthpiece M could be of the ordinary type and a cover C can be applied to said mouthpiece, said cover being made according to the invention. Said cover C may be made of elastic rubber composition.

It has been well known for many years that such mouthpieces accumulate layers of dust, both inside and outside, so that such mouthpieces become very unsanitary in a short time. It has been proposed to cleanse these mouthpieces regularly, using a suitable antiseptic cleansing fluid, but the action of such antiseptic is not permanent, and in addition, it is difficult to apply the antiseptic cleansing fluid to the mouthpiece of the French type of telephone, and there is danger of the liquid entering the telephone, and interfering with the operation of the telephone.

According to our invention we add to the rubber mix which is used for making the telephone, suitable basic or alkaline materials. The rubber mix may include other suitable ingredients, and it may be made and vulcanized in the ordinary manner.

For example, we can include in the rubber mix, approximately three percent by weight of sodium carbonate, or borax. Likewise, when we refer to the use of rubber, we also wish to include the use of either natural or artificial substitutes for rubber, including gutta-percha, balata, or the like.

The rubber composition may include as little as one-eighth of one percent of said added basic or alkaline material, and as high as twenty percent, the percentage being varied, according to the manner in which the compound is vulcanized. We can use an air vulcanization or cure, a steam cure, or an acid cure. We prefer to use about three percent of the said alkaline or basic material.

The basic or alkaline material is thoroughly mixed and dispersed throughout the rubber, so that it neutralizes any acid emissions from the skin.

In addition, or in place of the borax and sodium carbonate, we may also use di-sodium phosphate, tri-sodium phosphate, or sodium acetate, or substances of the same general class, preferably soluble in water.

We may also add to the rubber mix, colloidal silica in the proportion of one-half percent to fifteen percent, and we may also use sodium silicate in the proportion of one-half percent to ten percent. We may also use sodium benzoate in the proportion of one-half percent to ten percent.

Likewise the rubber mix may contain any suitable fillers, such as talc, china clay, finely divided silica and the like.

We may also use organic materials, as exemplified by salicylamide (commonly known in the trade as "shirlin").

Instead of using the sodium compounds above mentioned, we may use corresponding or equivalent potassium or ammonium salts or compounds.

In addition to an organic antiseptic, such as salicylamide, we can also use equivalent antiseptic substances such as chlorothymol, parachlorphenol, hexylresorcinol, and we can also use essential oils, such as oil of violet, and we can use thymol, pineol, and similar materials or groups. These preferred ingredients above mentioned, can be used either singly, or in any suitable combinations or groups.

For example, the rubber mix may contain one of the organic materials above mentioned, and one of the inorganic materials (such as sodium carbonate).

The salicylamide, the parachlorphenol and the hexylresorcinol may be used in amounts from one-half percent to twenty-five percent. Ordinarily it is sufficient to use from three percent to five percent. Whenever percentages are stated herein, it is to be understood that said percentages are by weight, and that they are based upon the entire weight of the rubber mix. The chlorothymol and the essential oils above mentioned, may be used in proportions of one-fourth percent to fifteen percent, but one percent is ordinarily preferable.

These antiseptic substances are thoroughly intermixed with the other ingredients of the rubber compound, during the milling. The essential oils, being liquid at a normal room temperature of about 70° F., fill the interstices between the rubber particles. All the materials above mentioned, can be gradually leached out of the completed vulcanized product, in order to give surface antiseptic properties. Substances such as chlorothymol, are in crystalline form at normal temperatures, and they may melt or dissolve during the milling or mastication of the rubber mixture. All of these substances are compatible with the rubber mix, and they are not destroyed by suitable vulcanization.

The mouthpieces made according to this invention can absorb and neutralize the excretory products of the body, and they have surface antiseptic properties for a long period of time. We have found that when the initial surface content of the added basic or antiseptic material has been used up additional material migrates from the interior of the rubber to the surface thereof, when the surface of the mouthpiece has a film of moisture.

The mouthpiece can be made of rigid rubber material of the usual type.

An alkaline material is to be considered as a species of a basic material, since both neutralize acid secretions of the skin.

We have described preferred embodiments of our invention, but we do not wish to be limited to the specific substances referred to herein, and it is to be understood that whenever we refer to a substance, said substance is to be taken as being representative of a general class or group of substances.

It is to be understood that whenever we refer to a mouthpiece in the claims, we include a cover for a mouthpiece of the ordinary type, since such cover, in effect, constitutes the surface of the mouthpiece.

We claim:

1. A mouthpiece for telephones or the like, said mouthpiece being made of rigid rubber material, said rubber material being vulcanized and having incorporated therein and dispersed throughout the same, a substantial proportion of an antiseptic substance which is leachable from the rubber by body emissions.

2. A mouthpiece for telephones or the like, said mouthpiece being made of rigid rubber material, said rubber material being vulcanized and having incorporated therein a substantial proportion of a material which can neutralize an acid, and which is leachable from the rubber by body emissions.

3. A mouthpiece for telephones or the like, said mouthpiece being made of rigid rubber material, said rubber material being vulcanized and having incorporated therein a sufficient proportion of an added material to give said rubber material surface antiseptic properties, said added material being leachable from the rubber by body emissions and being selected from the following substances:—an alkaline compound, colloidal silica, salicylamide, an antiseptic which is liquid at normal room temperature, chlorthymol, parachlorphenol, hexylresorcinal.

4. A mouthpiece for telephones or the like, said mouthpiece being made of rigid vulcanized rubber material, said mouthpiece containing an added material which can be leached out of said rubber material under the action of moisture which is located on the surface of said mouthpiece, said added material being selected from the class of acid-neutralizing or antiseptic materials.

5. A mouthpiece for telephones or the like, said mouthpiece having a cover made of flexible rubber material, said rubber material of the cover being vulcanized, and having incorporated therein and dispersed throughout the same, a substantial proportion of an antiseptic substance which is leachable from said cover by body emissions, said cover having surface antiseptic properties.

6. A mouthpiece for telephones or the like, said mouthpiece having a covering member which is made of flexible rubber material, said rubber material being vulcanized and containing an ingredient which can be leached out of said rubber material under the action of moisture, said ingredient being selected from the class of acid-neutralizing or antiseptic materials.

JACOB STEIN.
EPHRAIM FREEDMAN.